INVENTOR.
HAROLD D. DAIGH
BY Donald W Canady
ATTORNEY

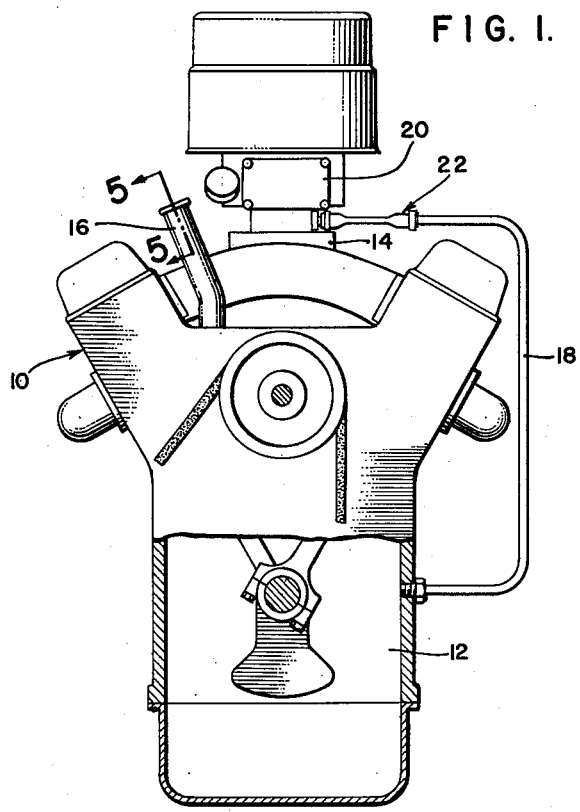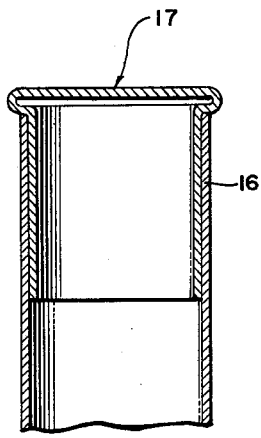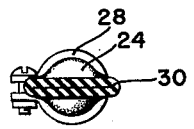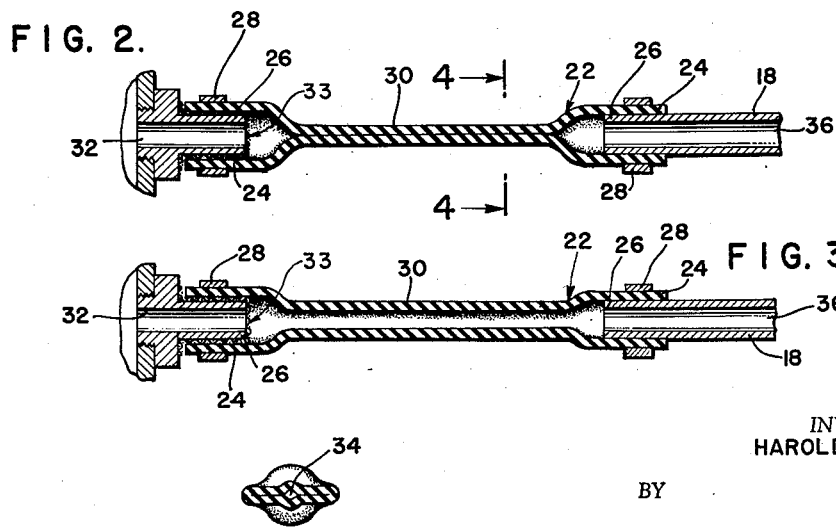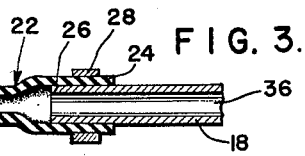
INVENTOR.
HAROLD D. DAIGH
BY
ATTORNEY Feb. 19, 1963 H. D. DAIGH 3,077,871
CRANKCASE VENTILATING SYSTEM FOR INTERNAL
COMBUSTION ENGINES
Filed March 19, 1962 5 Sheets-Sheet 2

Feb. 19, 1963 H. D. DAIGH 3,077,871
CRANKCASE VENTILATING SYSTEM FOR INTERNAL
COMBUSTION ENGINES
Filed March 19, 1962 5 Sheets-Sheet 3

INVENTOR
HAROLD D. DAIGH
BY

ATTORNEY

Feb. 19, 1963 H. D. DAIGH 3,077,871
CRANKCASE VENTILATING SYSTEM FOR INTERNAL
COMBUSTION ENGINES
Filed March 19, 1962 5 Sheets-Sheet 4

INVENTOR.
HAROLD D. DAIGH
BY
Donald W Canady
ATTORNEY

INVENTOR.
HAROLD D. DAIGH
BY Donald W Canady
ATTORNEY

# United States Patent Office 3,077,871
Patented Feb. 19, 1963

3,077,871
CRANKCASE VENTILATING SYSTEM FOR
INTERNAL COMBUSTION ENGINES
Harold D. Daigh, Rolling Hills Estates, Calif., assignor to
Richfield Oil Corporation, Los Angeles, Calif., a corporation of Delaware
Filed Mar. 19, 1962, Ser. No. 180,888
20 Claims. (Cl. 123—119)

This invention is a continuation-in-part of Serial No. 66,117 filed October 31, 1960, now abandoned, and relates to the recovery of crankcase fumes from an internal combution engine; more particularly this invention relates to a system for recycling crankcase blowby or crankcase fumes into the induction system by providing an external connection between the engine and the induction system and providing therein a flow control device for regulating the flow of crankcase fumes into the induction system.

Many proposals have heretofore been designed to collect crankcase blowby fumes and to direct them, by means of conduits and valves, back into the induction system of an internal combustion engine. These proposals are for the purpose of recovering crankcase fumes formed as the result of combustion of hydrocarbons and air, forming oxides of carbons and nitrogen, and water; and also to prevent moisture dropout due to condensation of the moist, combustible fumes within the crankcase which cause crankcase dilution, sludging, and rusting. Crankcase dilution and sludging may be reduced by continued removal of the hydrocarbon vapors found in the crankcase and rusting may be reduced by removal of water vapor.

The above mentioned prior art crankcase recycle or ventilating systems, generally involve a check valve or other valve mechanism in the conduit between the crankcase and the intake manifold. This check valve opens or varies the withdrawal of fumes through the conduit in response to manifold vacuum, thus subjecting the crankcase fumes to the action of the vacuum which results in sucking crankcase fumes from the crankcase into the intake manifold or induction system. As these crankcase fumes are drawn into the intake manifold, dirt, water and other objectionable objects may be drawn into the engine, causing increased engine wear and poor operation. In addition, the drawing of "fresh" air into the intake manifold results in poor performance, uncontrolled mixture strength and a distinct power loss. In some cases, however, better fuel mileage is obtained, and less sludge and varnish deposits are formed in the engine.

Many of the commercially available blowby recycle devices do not provide for the recovery of all of the crankcase fumes or blowby since the breather cap or ventilation outlets are left open so that air can be drawn therethrough. As a result, when crankcase fumes are excessive and the pressure in the crankcase exceeds atmospheric pressure, some of the crankcase fumes or blowby escapes into the atmosphere through the breather openings or oil filler cap. On the other hand, if in such prior art systems the breather openings are closed off, the crankcase is put under manifold vacuum which greatly increases the tendency to draw dirt and water into the crankcase from the outside, and to draw oxidized materials created from fuel, combustion products, and oil, from the crankcase, into the induction system. These prior devices are also inadequate in that at wide open throttle and during acceleration when the intake vacuum is low the valves are inadequate to handle the large amount of blowby gases, which then results in a pressure buildup in the crankcase. This causes expulsion of crankcase fumes through the breather cap into the atmosphere or under the hood of the vehicle. This expulsion of crankcase fumes into the atmosphere occurs at the time when the fumes are excessive and at the very time when effective recovery of crankcase fumes is most desirable. On the other hand, when there is sufficient vacuum to result in the opening of the passageway between the crankcase and the intake manifold in the prior art systems there necessarily is power loss due to the drawing of "fresh air" into the manifold and a resulting lowering of the intake manifold vacuum and, more importantly, the idling mixture strength will vary widely and the engine may stall due to either too rich or too lean a mixture, resulting in a very rough idle.

In addition to the theoretical deficiencies of the prior art proposals, the prior devices incorporating a valve in the conduit are subject to fouling and require troublesome servicing and replacement which, in addition to the increased first cost of the prior devices results in a higher overall cost.

It has also been proposed in the prior art to incorporate a diaphragm suspended plug valve between the crankcase and the intake manifold which valve is normally closed by atmospheric pressure or environmental pressure existing outside of the engine. Thus, when the crankcase pressure exceeds the external atmospheric pressure or external water pressure (in the event that the engine is operated under water) crankcase fumes may be discharged into the manifold. This system balances the crankcase pressure against the outside atmospheric or water pressure and employs a valve which is relatively expansive as compared to the present invention and which necessarily requires servicing and expansive installation cost.

It is, therefore, an object of the present invention to provide positive blowby recovery by providing a ventilation system between that portion of the engine subject to crankcase pressure and the induction system. It is also an object of the present invention to provide a system for the recovery of crankcase blowby by venting into the induction system through a conduit provided with a valve means which opens in response to crankcase pressure buildup.

It is a further object of my invention to provide a blowby recovery system employing a conduit between the crankcase system and the induction system whereby the conduit is normally closed by manifold vacuum to prevent power loss.

It is a further object of the present invention to provide a blowby recovery system which vents substantially all of the crankcase blowby into the induction system regardless of the intake manifold vacuum.

Other objects and a more complete understanding of my invention may be had by reference to the accompanying drawings taken in conjunction with the following description and claims in which:

FIGURE 1 shows an internal combustion engine employing a blowby recovery device embodying the present invention, FIGURE 2 is a sectional view of a valve device embodying my invention showing the manner in which it is connected in the conduit, FIGURE 3 is a sectional view of the valve shown in FIGURE 2 in open position, FIGURE 4 is a section on line 4—4 of FIGURE 2 showing a valve device of the present invention in closed position, FIGURE 5 shows the manner in which the oil fill cap may be closed off to seal the crankcase from outside air, FIGURE 6 shows a modification of the valve shown in cross section in FIGURE 4.

Figure 7:
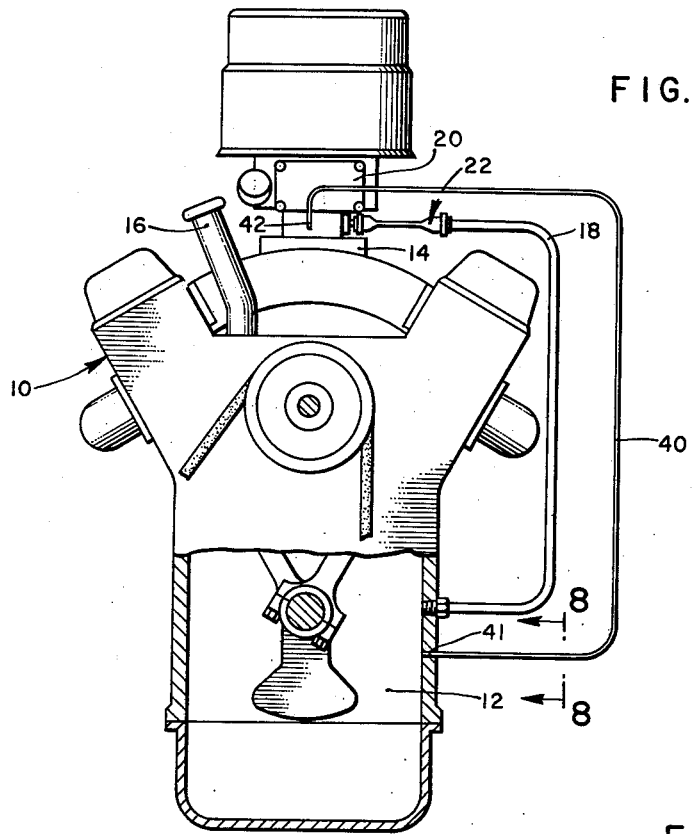
FIGURE 7 shows an internal combustion engine, partially in section, embodying a modification of my present invention.
Figure 8:
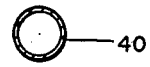
FIGURE 8 is a sectional view taken on section 8—8 of FIGURE 7.

Briefly stated, my invention comprises a blowby recovery system wherein the crankcase is closed to the direct entry of outside air and a conduit is provided between the crankcase system and the induction system having provided therein a valve member which is normally held closed by the intake manifold suction and which may be opened sufficiently to pass crankcase fumes into the induction system by the buildup of slight pressure in the crankcase system. The expression "crankcase system" is used herein to mean that portion of an internal combustion engine which is subject to crankcase pressure.

Referring more particularly to the drawings, FIGURE 1 shows a conventional internal combustion engine 10 having a crankcase 12 and an intake manifold 14. The oil fill opening 16 is equipped with a sealing type cap 17 such as shown in FIGURE 4. Other crankcase openings to outside air, for example, vents and breathers, which may appear in internal combustion engines to be equipped with the present blowby recycle system, should be closed off in any appropriate manner. A conduit 18 is provided between the crankcase system and the induction system, being connected to the induction system as, for example, to the intake manifold at a point at or below the carburetor 20 as shown in the drawings. The conduit could be connected directly to the carburetor, above the carburetor or at any practical point in the induction system. The conduit 18 may be connected to the crankcase system at any convenient point, e.g. the crankcase per se, the rocker arm cover, the valley cover, the oil fill cap, etc. and generally can most advantageously be connected at a higher point in the engine to reduce the amount of tubing needed, and to decrease the amount of oil and foreign matter sucked into the induction system.

Positioned in the conduit 18 is a flexible tube 22 which has a section thereof preformed in closed position as shown in FIGURE 2. The flexible tubing 22 may be connected between any two sections of the conduit 18 by slipping the ends 24 of the flexible tube over the end 26 of the conduit and clamping the flexible tube 22 in place over the conduit ends 26 with suitable screw-tightened clamps 28. The flexible tube 22 may have a section 30 preformed flat or in a closed position as shown in FIGURES 2 and 3, in order to insure immediate closure of the tube with a minimum manifold suction as will be explained hereafter. The tubing 22 can be made of any flexible, resilient material such as rubber, neoprene, or the like.

When the pressure of the crankcase fumes or blowby builds up within the crankcase, the pressure on the crankcase side 36 of the flexible tubing 22 is sufficient to overcome the tendency of the intake manifold suction or vacuum to seal the tubing 22 at the flattened section 30 against the flow of gas therethrough, and thus open the normally closed section 30 of the tubing as shown in FIGURE 3 to permit passage of blowby fumes or gases therethrough, into the induction system. When the pressure in the crankcase falls below the pressure required to open the flattened section 30 of the tube 22, the flexible tube 22 will normally be held together at the flattened section 30 by the effect of intake manifold vacuum.

As shown in FIGURES 2 and 3 a flame arrester 33 may be positioned over the manifold side 32 of the conduit opening over which the tubing 22 is placed. Flame arrester 33 preferably consists of a copper or copper alloy screen.

Figure 9:
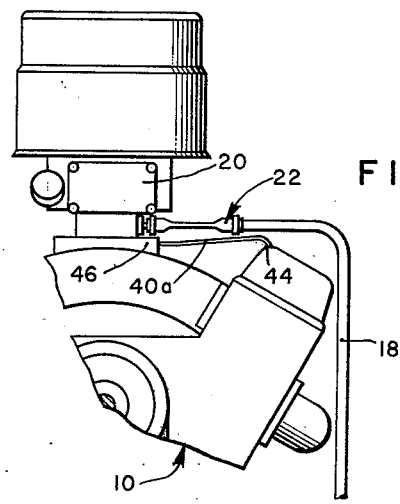
FIGURE 9 shows a cut away portion of an internal combustion engine embodying a modification of my present invention.

As a modification of the present invention a small auxiliary tube may be extended either from the crankcase proper as shown in FIGURE 7 or from the rocker arm cover as shown in FIGURE 9, at 40a to the induction system independent of the recycle conduit and flexible tube. This thin auxiliary tube provides an outlet for crankcase fumes from the crankcase to the induction system to thereby pass a small amount of blowby into the manifold any time without requiring sufficient crankcase pressure buildup to open the flattened section of tube 22. This thin auxiliary tube, 40 or 40a, on the other hand, is not large enough for the intake manifold vacuum to draw sufficient "fresh" air from the crankcase into the engine to result in power loss. This small auxiliary tube concept can be utilized also by preforming a narrow longitudinal opening 34 in the flattened section 30 of the flexible tube 22 as shown in FIGURE 6. This capillary opening or orifice 34 would always remain open to pass blowby gases into the intake manifold without the need for sufficient blowby pressure to open the flattened section of tube 22 except when the manifold vacuum is high, that is, in excess of 20 inches of mercury. The required size of the thin auxiliary tube or orifice varies with the size of the engine and generally should be of larger size for larger engines to accomplish the same suction effect.

The pressure required to expel the crankcase fumes into the intake manifold, that is, the pressure required to open the flattened section 30 varies with the manifold vacuum, type of tubing material and the engine on which the device is installed. It was found, however, that blowby pressure on the order of 14 inches of water was sufficient to open a rubber tubing on a 1959 Ford V–8 (292 cubic inch engine) at 20 inches mercury vacuum, and that on the same automobile at 4 inches of mercury vacuum, blowby pressure equivalent to 1 inch of water was required to open the flattened section of the flexible tube. Thus it is apparent that pressures on the order of 1 inch of mercury will be sufficient to operate my blowby recycle device even at the maximum operating manifold vacuum. At such higher vacuum, for example during deceleration, the blowby pressure normally is at a minimum since less blowby is generated in a normal engine and consequently the need for recovery is less during these high vacuum periods.

It can thus be seen that the present invention is most effective at high power settings (i.e., low manifold vacuum) where the blowby is at its maximum value since the crankcase pressure will be large enough to open the flattened section 30 of the flexible tube 22 and to permit passage of the blowby from the crankcase into the intake manifold.

Figure 10:
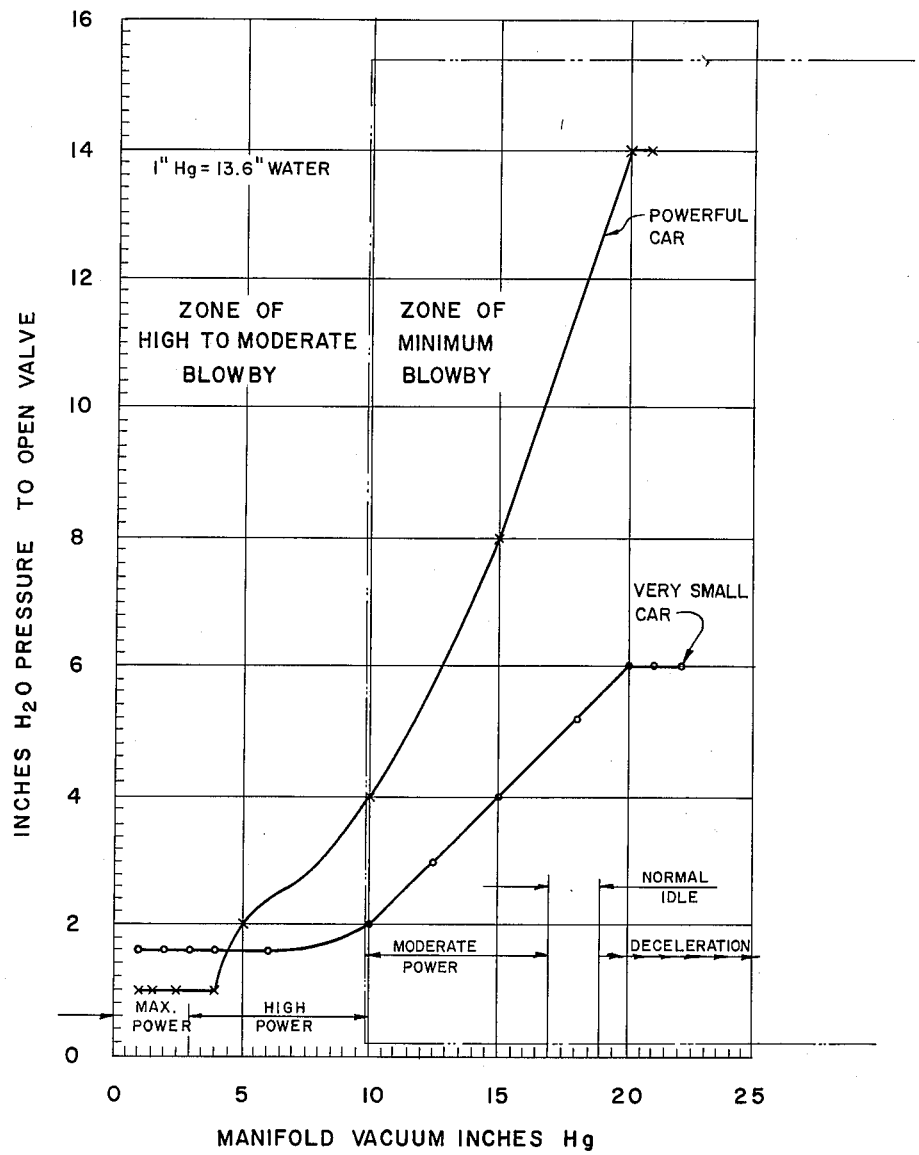
FIGURE 10 is a graphical plot of manifold vacuum against pressure required to open the flexible valve.

The graph shown in FIGURE 10 shows the manner in which the pressure required to open the valve 22 varies with the manifold vacuum, on two different types of automobile, a 1959 Ford V–8 and a 1958 Renault. The abscissa of this graph is appropriately marked to indicate the vacuum at various power settings. The zone encompassed by the large box represents engine operating conditions which result in minimum blowby or crankcase fumes. It is apparent from this graph that where maximum blowby is generated and blowby recovery is most needed, the pressure required to open my tubular valve 22 is minimal.

Figure 11:
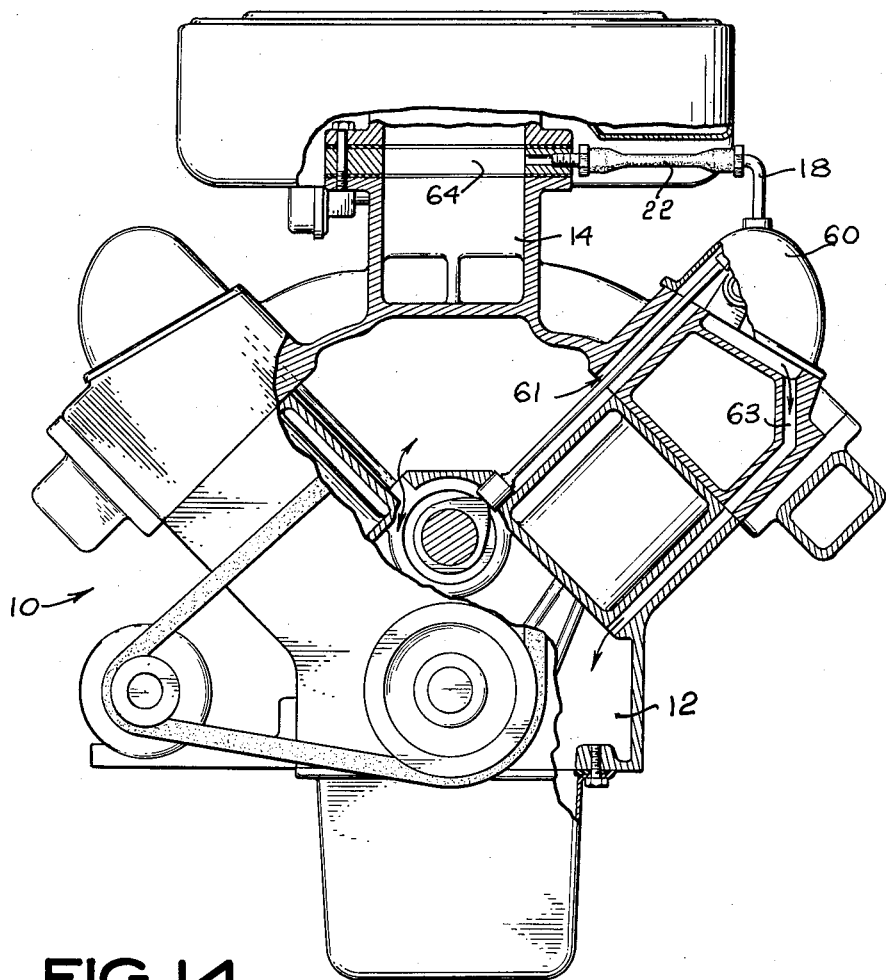
FIGURE 11 shows a sectional view of an internal combustion engine having a valved conduit extending between the rocker arm cover and the induction system.
Figure 12:
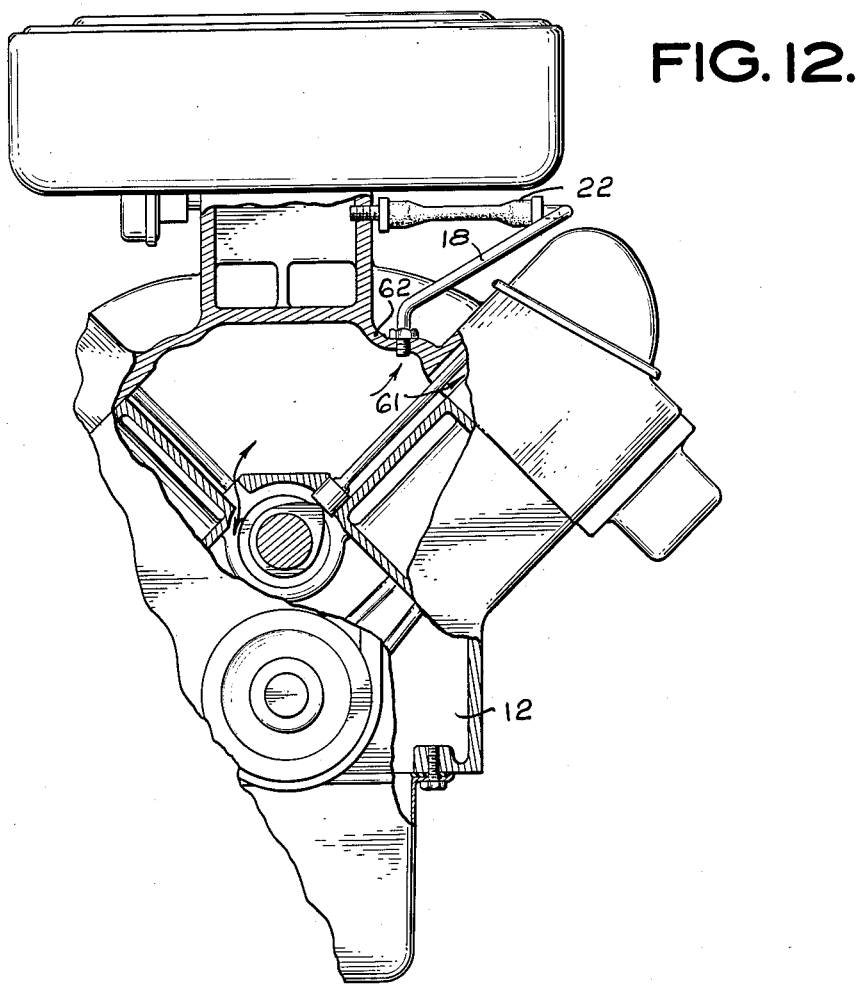
FIGURE 12 is a sectional view of an internal combustion engine having a valve conduit extending from the valley cover to the induction system.

FIGURE 11 shows a modification of my present invention wherein the conduit 18 is connected to the rocker arm cover 60 which is subject to the crankcase pressure through passageway 61 and return passageways 63. The valve device 22 is shown in position in the induction system on a carburetor adapter 64, although the valve may be attached directly to the induction manifold 14. FIGURE 12 shows a modification of my present invention wherein the conduit 18 is connected to the crankcase system through the valley cover 62 of a V type internal combustion engine.

Figure 13:
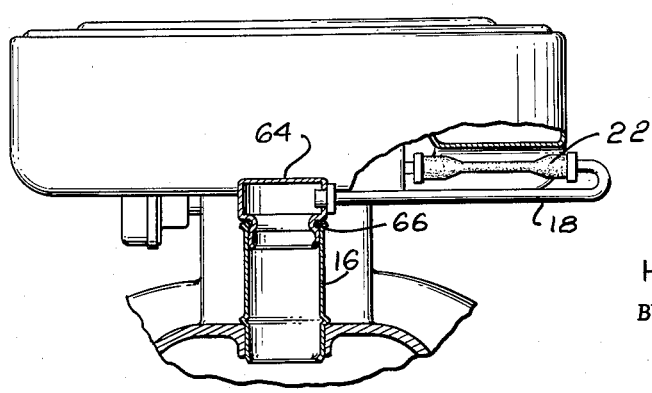
FIGURE 13 is a sectional view through the oil fill pipe of an internal combustion engine illustrating a modification of the present invention wherein the valve device is attached to an oil fill sealing cap.

The modification of my present invention shown in FIGURE 13 has the conduit 18 connected to a sealed oil fill cap 64. The oil fill cap 64 may be sealed into the oil fill pipe 16 with a suitable O ring 66 to prevent blowby fluids from escaping the breather pipe through openings other than through the conduit 18. The oil fill pipe 16 is shown positioned in the valley cover, although it is often connected directly into the crankcase. In either instance, however, the oil fill pipe is subject to crankcase pressure.

Figure 14:
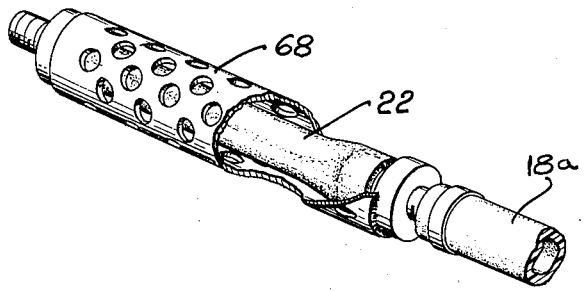
FIGURE 14 shows in partial section a modification of my present invention wherein a perforated bracket is utilized to support the flexible valve device.

FIGURE 14 shows a modification of my present invention which permits the use of a flexible conduit 18a. This apparatus utilizes a perforated bracket member 68 which supports the flexible tube 22 at or near the induction system connection.

Although I have described my invention with a certain degree of particularity, it is to be understood that it should not be limited to the details set forth, but should be afforded the full scope of the appended claims.

I claim:

1. In a crankcase ventilating system for internal combustion engines having an opening in the engine above the oil level through which blowby fluids can escape the engine and conduit means providing fluid communication between said opening and the induction system of said engine, said opening being subject to the crankcase pressure, the improvement comprising valve means positioned in said conduit means said valve means being normally closed in response to manifold vacuum and adapted to open in response to pressure buildup in said crankcase to pass blowby fluids through said conduit means into said induction system.

2. In a crankcase ventilating system for internal combustion engines having a single opening in the crankcase above the oil level through which blowby fluids can escape the crankcase, and wherein conduit means provide fluid communication between said opening and the induction system, the improvement comprising shutoff means within said conduit means said shut-off means being normally closed by manifold vacuum and adapted to open in response to blowby fluid pressure buildup in said crankcase to pass blowby fluids through said conduit means into said induction system.

3. In a crankcase ventilating system for internal combustion engines having a single opening in the crankcase above the oil level through which blowby fluids can escape the crankcase and wherein conduit means provide fluid communication between said opening and the induction system, the improvement comprising flexible shutoff means within said conduit means said flexible shutoff means being preformed closed and normally held in closed position by manifold vacuum, said shutoff means being adapted to open in response to pressure buildup in said crankcase to pass blowby fluids through said conduit means into said induction system.

4. In a crankcase ventilating system for internal combustion engines having a single opening in the crankcase above the oil level through which blowby fluids can escape the crankcase, and wherein conduit means provide fluid communication between the crankcase and the induction system, the improvement comprising a collapsible, resilient tubular shutoff member having a portion of its tubular cross section preformed with its tubular walls in abutting relationship said shutoff member being positioned in said conduit means and normally closed by intake manifold vacuum, said shutoff member being adapted to open in response to crankcase pressure buildup in said crankcase to pass fluids through said conduit means into said induction system.

5. A crankcase ventilating system for internal combustion engines comprising in combination: an opening in the crankcase above the oil level through which blowby fluids can escape the crankcase, an opening in the induction system, conduit means connecting said crankcase opening with said induction system opening, valve means positioned within said conduit means, said valve means being normally held closed by intake manifold vacuum and adapted to open in response to crankcase pressure buildup in said crankcase to pass fluids through said conduit means into said induction system.

6. A crankcase ventilating system for internal combustion engines comprising in combination: an opening in the crankcase above the oil level through which blowby fluids can escape the crankcase, an opening in the induction system, conduit means connecting said crankcase opening with said induction system opening, a flexible tubular member positioned in said conduit means and having the inner walls of said tubular member preformed in a substantially closed manner along a portion of said tubular member said tubular member being normally closed by intake manifold vacuum, said tubular member being adapted to open in response to crankcase pressure buildup in said crankcase to pass fluids through said conduit means into said induction system.

7. A crankcase ventilating system for internal combustion engines comprising in combination: an opening in the crankcase above the oil level through which blowby fluids can escape the crankcase, an opening in the induction system below the carburetor, conduit means connecting said crankcase opening with said induction system opening and a flexible tubular member positioned in said conduit means and having the inner walls of said tubular member preformed in a substantially closed manner along a portion of said tubular member said tubular member being normally closed at said preformed closed portion by intake manifold vacuum, said tubular member being adapted to open in response to crankcase pressure buildup in said crankcase to pass fluids through said conduit means into said induction system.

8. A crankcase ventilating system for internal combustion engines comprising in combination: an opening in the crankcase above the oil level through which blowby fluids can escape the crankcase, an opening in the intake manifold, conduit means connecting said crankcase opening with said intake manifold opening, a flexible tubular member positioned in said conduit means and having the inner walls of said tubular member preformed in a substantially closed manner along a portion of said tubular member, said tubular member being normally closed at said preformed closed portion by intake manifold vacuum, said tubular member being adapted to open in response to crankcase pressure buildup in said crankcase to pass fluids through said conduit means into said intake manifold.

9. In a crankcase ventilating system for internal combustion engines having an opening in the crankcase above the oil level through which blowby fluids can escape the crankcase, and wherein conduit means provide fluid communication between said opening and the induction system, the improvement comprising: valve means positioned in said conduit said valve means being normally closed by manifold vacuum and adapted to open in response to pressure buildup in said crankcase to pass blowby fluids through said conduit means into said induction system and a second conduit means providing fluid communication between said crankcase and said induction system.

10. The apparatus of claim 9 wherein said second conduit means is of a size to prevent passage of sufficient blowby fluids into the intake manifold to result in substantial power loss.

11. In a crankcase ventilating system for internal combustion engines having a first opening in the crankcase above the oil level through which blowby fluids can escape the crankcase, and wherein conduit means provide fluid communication between said opening and the induction system, the improvement comprising: valve means within said first conduit means said valve means being normally closed by manifold vacuum and adapted to open in response to blowby fluid pressure build-up in said crankcase to pass blowby fluids through said conduit means into said induction system, a second opening in the rocker arm cover of said internal combustion engine, and a capillary conduit means providing fluid communications between said second opening and said induction system said capillary conduit means being of a size as to prevent passage of sufficient blowby fluids into the intake manifold to result in substantial power loss.

12. A crankcase ventilating system for internal combustion engines comprising in combination: an opening in the crankcase above the oil level through which blowby fluids can escape the crankcase, an opening in the intake manifold, conduit means connecting said crankcase opening with said intake manifold opening, a flexible tubular member positioned in said conduit means and having the inner walls of said tubular member preformed in a substantially closed manner along a portion of said tubular member, and having a capillary opening through said closed portion, said tubular member being normally substantially closed at said preformed closed portion by intake manifold vacuum, said tubular member being adapted to open in response to crankcase pressure buildup in said crankcase to pass fluids through said conduit means into said intake manifold, said capillary opening being of a size to prevent the passage of sufficient blowby fluids into the crankcase manifold to result in substantial power loss.

13. The apparatus of claim 11 wherein said capillary opening is preformed in said flexible tubular member.

14. In a crankcase ventilating system for internal combustion engines having an opening in the rocker arm cover through which blowby fluids can escape the crankcase and conduit means providing fluid communication between said opening and the induction system of said engine, said opening being subject to the pressure in the crankcase of said engine, the improvement comprising valve means positioned in said conduit means said valve means being normally closed in response to manifold vacuum and adapted to open in response to pressure buildup in said crankcase to pass blowby fluids through said conduit means into said induction system.

15. A crankcase ventilating system for internal combustion engines having an oil fill opening in the crankcase system of said engine, comprising in combination: a removable plug cap in said oil fill opening, a conduit means providing fluid communication between said cap and the induction system of said engine, said cap being adapted to receive said conduit means, valve means positioned in said conduit means said valve means being normally closed in response to manifold vacuum and adapted to open in response to pressure buildup in said crankcase system to pass blowby fluid through said conduit means into said induction system.

16. In a crankcase ventilating system for internal combustion engines having an opening in the engine above the oil fill level through which blowby fluids can escape the engine and conduit means providing fluid communication between said opening and the induction system of said engine, said opening being subject to the crankcase pressure, the improvement comprising valve means positioned in said conduit means said valve means being normally closed in response to manifold vacuum and adapted to open in response to pressure buildup in said crankcase to pass blowby fluids through said conduit means into said induction system, said valve means being supported within a rigid perforated member.

17. The apparatus of claim 16 wherein said conduit means is a flexible member.

18. An oil fill cap for plugging an oil fill opening in an internal combustion engine having conduit means to provide fluid communication between the crankcase system and the induction system of said engine and wherein valve means are positioned in said conduit means to control the fluid flow between said crankcase and said induction systems, said valve means being normally closed by manifold vacuum and adapted to open in response to fluid pressure buildup in said crankcase system to pass fluids through said conduit means into said induction system comprising: a member having an open end and a closed end, means for sealing said open end within said oil fill opening, and means in said closed end for receiving said conduit means whereby fluid may be passed from said crankcase system to said induction system when said valve means open.

19. In a crankcase ventilating system for internal combustion engines having an opening in the engine above the oil fill level through which blowby fluids can escape the engine and circuit means providing fluid communication between said opening and the induction system of said engine, said opening being subject to the crankcase pressure, the improvement comprising: valve means positioned in said conduit means, said valve means being normally closed in response to manifold vacuum and adapted to open in response to pressure buildup in said crankcase to pass blowby fluids through said conduit means into said induction system, and a rigid member, said valve means being positioned within said rigid member.

20. In a crankcase ventilating system for V type internal combustion engines having an opening in the valley cover through which blowby fluids can escape the crankcase comprising in combination: conduit means providing fluid communication between said opening and the induction system of said engine, said opening being subject to the pressure in the crankcase of said engine, valve means positioned in said conduit means, said valve means being normally closed in response to manifold vacuum and adapted to open in response to pressure buildup in said crankcase to pass blowby fluids through said conduit means into said induction system.

References Cited in the file of this patent
UNITED STATES PATENTS
1,421,567    Ricky et al. _____ July 4, 1922